US 6,560,565 B2

(12) United States Patent
Roy et al.

(10) Patent No.: US 6,560,565 B2
(45) Date of Patent: May 6, 2003

(54) SATELLITE-BASED SEISMIC MOBILE INFORMATION AND CONTROL SYSTEM

(75) Inventors: James Roy, Dewinton (CA); Jackie L. A. Portsmouth, Redwood Meadows (CA); Edward J. Krakiwsky, Calgary (CA); Sean E. Krakiwsky, Calgary (CA)

(73) Assignee: Veritas DGC Inc., Houston, TX (US)

( * ) Notice: Subject to any disclaimer, the term of this patent is extended or adjusted under 35 U.S.C. 154(b) by 0 days.

(21) Appl. No.: 09/558,990

(22) Filed: Apr. 27, 2000

(65) Prior Publication Data

US 2002/0152053 A1 Oct. 17, 2002

Related U.S. Application Data

(60) Provisional application No. 60/131,906, filed on Apr. 30, 1999.

(51) Int. Cl.[7] .............................................. G06F 15/00
(52) U.S. Cl. ...................................... 702/188; 702/189
(58) Field of Search ....................... 700/9, 302; 702/14, 702/188, 79, 6, 7, 9, 11, 12, 13, 16, 17, 18; 370/324; 706/928, 929; 367/14, 38, 75, 77; 375/259; 364/513

(56) References Cited

U.S. PATENT DOCUMENTS

| | | | | | |
|---|---|---|---|---|---|
| 4,713,775 A | * | 12/1987 | Scott et al. | ................. | 364/513 |
| 4,814,711 A | * | 3/1989 | Olsen et al. | ................. | 324/331 |
| 5,793,813 A | * | 8/1998 | Cleave | ................. | 375/259 |
| 5,822,273 A | * | 10/1998 | Bary et al. | ................. | 367/77 |
| 5,920,828 A | * | 7/1999 | Norris et al. | ................. | 702/14 |
| 6,208,626 B1 | * | 3/2001 | Brewer | ................. | 370/324 |
| 6,226,601 B1 | * | 5/2001 | Longaker | ................. | 702/79 |

* cited by examiner

*Primary Examiner*—John Barlow
*Assistant Examiner*—Douglas N Washburn
(74) *Attorney, Agent, or Firm*—Conley Rose, P.C.

(57) ABSTRACT

A seismic system, Seismic Mobile Information & Control System (Seis-MICS) comprising field resources, satellite resources, and office resources. The field resources include various personnel, equipment, and vehicles located in the general vicinity of the seismic project. The field resources include transceivers permitting various of the field resources to communicate directly, or indirectly, to the office resources via one or more satellites. The office resources include satellite earth hubs/stations, a server-side hardware, software, and data store, and user workstations. The seismic system advantageously facilitates real or near real time transmission of data between the field and office environment, thereby providing an efficient seismic operation.

20 Claims, 7 Drawing Sheets

SATELLITE-BASED SEISMIC MOBILE INFORMATION AND CONTROL SYSTEM

CROSS-REFERENCE TO RELATED APPLICATIONS

This is a non-provisional application based on and claiming priority to U.S. Provisional Application Ser. No. 60/131,906, filed Apr. 30, 1999, incorporated herein by reference in its entirety.

STATEMENT REGARDING FEDERALLY SPONSORED RESEARCH OR DEVELOPMENT

Not applicable.

BACKGROUND OF THE INVENTION

1. Field of the Invention

The present invention generally relates to seismic operations. More particularly, the invention relates to seismic operations using satellites to provide communication between the field of operations and the office environment. Still more particularly, the invention relates to an integrated satellite-based seismic information system, facilitating efficient management of resources and assets in the field.

2. Background of the Invention

The field of seismology focuses on the use of artificially generated elastic waves to locate subsurface structures which may contain mineral deposits such as hydrocarbons, ores, water, and geothermal reservoirs. Seismology also is used for archaeological purposes and to obtain geological information for engineering. Exploration seismology provides data that, when used in conjunction with other available geophysical, borehole, and geological data, can provide information about the structure and distribution of rock types and their contents.

Most oil and gas companies rely on the interpretation of seismic data for selecting the sites in which to invest in drilling exploratory and production oil and gas wells. Despite the fact that seismic data is used to map geological structures rather than finding petroleum directly, the gathering of seismic data has become a vital part of selecting the site of an exploratory and/or development well. Experience has shown that the use of seismic data greatly improves the likelihood of a successful venture.

The process of designing, planning, taking seismic measurements, and processing the data generally is referred to as a "seismic project." Although the scale of seismic projects vary depending on the depth of the subsurface structures, size of the area to be surveyed, and other factors, most seismic projects use a common set of equipment. A "source" device creates the energy that propagates into the earth. "Receivers" detect the energy after it reflects off subsurface interfaces between rock formations. The time between emitting the impulse from the source and detecting the reflected impulse by a receiver is used to determine the distance to the subsurface structure under investigation. At least several different energy sources have been used at times, but most large scale land-based projects (seismic projects can also be performed at sea) use either high amplitude explosives or lower amplitude vibrators as the source.

Explosives produce high-energy, short time duration impulses. The explosive source and the associated data acquisition and processing system are relatively simple. Explosive charges usually are placed into holes drilled in the ground by drilling trucks, portable drills and personnel, and subsequently detonated.

Seismic projects alternatively may use low magnitude, vibratory energy. Rather than imparting a high magnitude pressure pulse into the earth in a very short time period as with explosive charges, vibratory sources emit lower amplitude pressure waves over a longer time period typically between 5 and 7 seconds, but longer time periods are also possible. A total interval of 5 to 32 seconds is possible. Further, the frequency of the vibrating source varies from a low of about 5 to 10 Hz to a high of 100 to 150 Hz, although the specific low and high frequencies differ from system to system. The frequency of the source may vary linearly with respect to time or non-linearly. The frequency variations are commonly called a "frequency sweep." The frequency sweep thus typically is between 5 and 150 Hz and on average 12 seconds in duration. The magnitude of the seismic wave oscillations may vary or remain at a constant amplitude.

Many other types of equipment are used in seismic projects. As noted above, drilling trucks are used to drill holes in the ground at predetermined locations for positioning and detonating explosive charges. Further, vibrator trucks are used to generate the vibratory energy. Recording equipment is used to record the seismic data. "Line cutters" are used to clear trees and other obstacles from the area in which the sources and receivers are to be placed. Transportation in the survey area is provided by trucks, buses, all terrain vehicles, and other types of vehicles. Helicopters are used to ferry people and equipment to the site of the project. In addition, large scale projects may require over one hundred personnel in the field to perform a myriad of tasks such as clearing the line, setting up and dismantling the equipment, locating the sites for placement of the sources and receivers, precisely determining the coordinates of source and receiver points, as well as numerous other tasks. Such personnel require food, water, lodging and other facilities and resources. Project critical vehicles such as vibrators require prompt fueling. Periodically, equipment malfunctions. Trouble shooting equipment including vehicles, testing and repair equipment is provided in the field along with skilled personnel to trouble shoot the malfunctions and effectuate any necessary repairs. A typical project may include over one hundred personnel and several hundred pieces of equipment, many of which are mobile, and vehicles. Accurately tracking and coordinating these resources is vitally important to increase the efficiency of the survey and thus lower the costs. Managing the field resources, however, becomes increasingly problematic as the size of the project area increases. Many projects may require field-based equipment and personnel spread out over several hundred square miles. Other equipment and personnel may be located in various sites, such as the surveying company's head office, around the globe.

A typical seismic project begins with a request to a seismic company to run a seismic project in a particular area of the world. The request, from the seismic company's client, initiates a planning phase in which seismic designers, typically geophysicists, design the project grid—made up of source and receiver points. The designed project grid is to be confirmed and modified in the surveying phase of the overall seismic process. The design activity involves reviewing maps of the area to be surveyed and determining where the seismic sources and receivers should be located. Usually, a series of measurements, or "shot records," are performed in each survey and the sources and receivers must be relocated between each shot record.

Source and receiver locations are determined in three dimensions in terms of geodetic latitude, longitude and height. The height dimension is the distance from a source or receiver point to the surface of a reference ellipsoid. Thus, the height is the distance over or above the ellipsoid. The ellipsoid height is the sum of the geoid height and orthometric height (height above sea level). The ellipsoid is an industry standard whose geometric center is ideally at the center of gravity of the Earth, and whose minor axis coincides with the rotation axis of the Earth. The size and shape of the ellipsoid is chosen to best represent the Earth in the mean sense. The WGS84 (World Geodetic System 1984) is one such industry standard. The accuracy specifications for the coordinates of sources and receivers are generally specified in terms of meter or submeter accuracy. The maintenance and assessment of this accuracy is critical to seismic surveys.

Survey designers use digital maps to help them design the survey. These maps indicate the locations of ponds, roads or other obstructions that may interfere with the otherwise desirable location of the seismic equipment. Thus, the quality of the survey design at least partially is a function of the quality of the maps. Poor quality maps (i.e., inaccurate maps or maps which have not been recently updated) detrimentally impact the quality of seismic survey.

In addition to maps, survey designers must also consider local permitting regulations and surface and mineral rights ownership when designing the survey. A client may desire the survey to be performed over a number of parcels of land, each parcel owned by one or more individuals. Determining ownership interests generally requires access to local deed records. Permits must also be obtained to conduct a survey. Permit requirements may vary from locality to locality.

Seismic equipment is transported by helicopter and truck to the field and setup by field crews. A "coordinator shack" is setup in the vicinity of the area to be surveyed. The coordinator shack usually includes communication and computer equipment used by a coordinator to oversee and manage various activities in the field. Such activities include managing the ground equipment, coordinating helicopters, trucks and line personnel to deploy and retrieve equipment.

The locations of the sources and receivers specified by the survey designer are called "pre-plot" coordinates. Ideally, field surveyors position the sources and receivers in the field exactly at the pre-plot coordinates. Using the pre-plot coordinates and standard, albeit not highly accurate positioning techniques, the field personnel estimate the location in the field corresponding to the pre-plot coordinate. Then, using sophisticated locating equipment, such as the Global Positioning System (GPS), the field personnel determine how close their initial estimate was to the pre-plot coordinate, and adjust their location to more precisely match the pre-plot coordinates. The GPS currently includes an array of 24 satellites in orbit approximately 22,000 kilometers above the Earth. Ground-based GPS satellite receivers receive and interpret signals from the GPS satellites to determine the location of each receiver depending on the particular GPS technique used. GPS provides accuracy from about 30 meters to less than 1 meter (i.e., submeter accuracy). The field crew uses GPS receivers to try to position the sources and receivers as close to the pre-plot coordinates as possible.

Unfortunately, it is rarely possible to position the source and receiver equipment exactly at the pre-plot coordinates. Ponds, roads, and other obstructions not shown on the maps used by the survey designers may prevent the equipment from being positioned where specified by the survey. Additionally, even though GPS provides accurate positioning data, the actual location of the equipment still may not exactly match the pre-plot coordinates because of inaccuracies in the GPS system and/or lack of skill in the personnel using the GPS system. At times, GPS equipment may malfunction and personnel may make blunders thereby resulting in erroneous coordinates for the source and recorder points.

Before the shot record is taken, the field personnel determine the actual location of the equipment. These GPS-determined coordinates are referred to as "actuals." Any discrepancy between the actual and pre-plot coordinates may impact the interpretation of the resulting seismic data. It is thus important to relay the actual coordinates to the survey design team for evaluation. The actual coordinates are part of what generally is termed the "quality control" (QC) data. The QC data includes the actual coordinates, usually provided in three dimensions, along with standard deviations associated with each coordinate. The standard deviation of a coordinate provides a statistical indication of the level of accuracy of the measured actual coordinate. Sending the QC data to the design team, which may be located in the seismic survey company's home office half way around the world, usually is accomplished by facsimile transmission of hand-written or typed out notes, and usually occurs between 3 and 7 days after the preplot coordinates have been surveyed and the shot record is taken. The time lag occurs because communication of data from the field to the home office is not efficient. The inefficiency results from the lack of an electronic communications infrastructure between the field and the office environment.

With QC data, the design team compares the actual coordinates to the pre-plot coordinates and determines whether the actuals were within specification. If some of the actual coordinates are out of specification (actual coordinate too far from the preplot coordinate), the designer must decide whether the survey can simply omit the seismic data from that particular design or whether the "actual" location be repositioned or shot record rerun. If the survey designer chooses the latter approach (i.e., resurvey the coordinates of the point, and/or reshoot the record), the equipment, which by then may have been moved to another location to perform another shot record, must be brought back and set up again. Considerable and undesirable time and expense is associated with reshooting a record or resurveying a point for which equipment must be brought back and set up again.

While the survey is underway, the client company often wishes to know the status of the survey as well as be provided with assurance that the acquired seismic data is reliable and usable. Accordingly, the client must hire a person referred to as a "bird dog" to follow the seismic field crew and verify the accuracy of the survey. Bird dogs are usually highly trained and expensive resources that add to the cost of the seismic survey. Without bird dogs, however, the client has little insight into the activity in the field as it occurs.

A seismic operation can be broken down into five major areas:
 (1) Overall Project Management
 (2) Mobilization and Demobilization
 (3) Surveying
 (4) Drilling
 (5) Recording Overall project management includes planning, designing, and quality control. Mobilization and demobilization involves moving equipment to a survey site, setting it up, disassembling it and moving the equipment to the next site. Surveying refers to the use of conventional survey techniques or GPS to the locating and "staking" of the source and receiver points. The surveying of points can be done by a surveyor ahead of the drilling and recording or it can be done in conjunction with these activities. Drilling operations involve drilling holes at the source points in which the explosive charges are placed. When explosives are not used, vibrators are employed at the source points. Finally, recording includes recording the seismic data detected by the receivers. As noted below, significant shortcomings exist with respect to conventional process of performing seismic survey or project in each of the aforementioned five areas.

In the project management area, one of the major shortcomings includes non-existent or inconsistent use of digital maps. Further, poor quality and/or outdated maps contribute to errors in the design of the survey. Field personnel, for example, may update a map, but there may be a considerable time lag before the updates are provided to the experts in the home office.

Further, the inability to accurately track equipment causes inefficiencies in the coordination of mobile units and people. For example, vehicles may be dispatched to one side of a river or canyon to repair equipment that is located on the other side of the obstacle.

Inefficient tracking of mineral rights and land ownership information associated with permitting is another problem in the project management area driving up the cost of the survey. Local municipalities and other regulatory agencies must be researched each time a survey is to be performed in a particular area by a client. If a different client wishes to survey the same area, that client, or its survey company, must undesirably repeat the same research into ownership and permit issues.

Project management in conventional seismic survey operations usually requires highly skilled, and thus expensive, labor in the field rather than in the office environment. Such people are required to oversee the operation in the field to ensure the integrity of the data. In general, the cost associated with placing a person in the field, which includes travel, lodging, food, etc., is higher than if that person was located at his or her home office. If faster and more efficient communication of data between a central office and the field was available, it might be feasible to locate the higher skilled workers in the office environment, rather than in the field. Further, scattering such skilled personnel across the globe at various seismic project sites does not permit the beneficial sharing of information between the various skilled professionals.

Mobilization and demobilization of equipment and personnel has its own set of problems. For instance, conventional seismic operations do not have a highly accurate, efficient mechanism for tracking the location of the equipment including the vehicles to transport the equipment. It thus is difficult to keep track of transportation vehicles, some of which may still be loading equipment from a previous job while other vehicles are deploying equipment to the next job site hundreds of miles away. The inability to accurately and inefficiently track equipment makes inventory control problematic. One piece of equipment may be stolen or misplaced and not noticed as missing for several days. Additionally, conventional mobilization and demobilization systems do not provide a mechanism for accurately monitoring the time field personnel actually spend working, thereby potentially creating inaccuracies in client billing.

Shortcomings in the surveying phase include excessive waste of time and money having to re-stake points when the surveyor or geophysicist reviews the QC data and determines that a particular surveyed point or shot record must be rerun. As noted above, the increased costs includes bringing equipment back to the site of the original shot record, setting up the equipment again, and repositioning the point or rerunning the shot record. This process may cost 2 to 3 times the cost of the initial record.

In addition, typical seismic survey systems force field personnel to repetitively enter and log the same data leading to longer survey times at higher cost to the client. For example, a driller may provide hand-written reports to the drill supervisor who, in turn, corrects and rewrites the report and delivers the corrected report to the project manager. The project manager then manually inputs the corrected report into a computer and then emails the report to the home office. Not only is this a time consuming and expensive process, considerable room for error exists because of the repeated human involvement with the data entry.

Surveying problems also include a lack of "real-time" integrity monitoring available to the client. As such, the client generally is not able to monitor the integrity of the survey as it is occurring without incurring the substantial cost of hiring a bird dog in the field. Additionally, surveying suffers from excessively long time periods in the communication loop between field personnel and the geophysicists in the home office.

In the drilling area, there is considerable redundancy involved with recording and logging drill information. As noted above, drillers maintain hand written logs of hole depth, dynamite charge size, hole cutting analysis and the like. This log is physically handed to the drill manager who revises the log and has the log's information manually inputted into a computer or other communication device for transmission to the head office. This process is slow and error prone. Drilling operations also rely heavily on physically staked points for positioning of source drills and vibrators. The source point is marked by a survey flag which is imprinted with the drill or vibrator location identifier. These flags often are washed away by rain, buried by snow, or destroyed by cattle or field cultivation. Extra time is expended, at increased cost to the client, to relocate the source point, or the hole may be missed altogether (i.e., not drilled).

Finally, the recording activity has its share of shortcomings as well. Geophysicists in the home office and the client generally are not provided with the recorded quality control data fast enough to analyze the data for accuracy while the equipment is still on location. The inability of conventional seismic systems to provide QC data to the client quickly forces the client undesirably to hire expensive bird dogs in the field as noted previously. Also, currently no conventional seismic system has the capability to transmit all the core seismic data back to the office environment for faster processing and delivery to the client as the end product.

Thus, seismic operations require the planning and coordination of numerous different types of activities and hundreds of personnel. Such activities typically are performed at various sites across the globe making coordination at times a monumentally difficult task. It is highly desirable for the overall seismic operation to be as efficient as possible, thereby reducing time and cost. The problems and inefficiencies of conventional seismic operations, some of which are outlined above, have plagued the seismic industry for a long time. A seismic system that mitigates or solves these problems and provides a more efficient process would be highly desirable. To date, substantial room for improvement exists in the seismic field.

BRIEF SUMMARY OF THE INVENTION

The deficiencies of the prior art described above are solved in large part by a real time data gathering, quality control ("QC") and information distribution system, comprising field resources, satellite resources, and office resources that are located at a different site from the field. The field resources include various personnel, portable offices or traitors, equipment, and vehicles located in the general vicinity of the area to be surveyed. The field resources also include mobile and fixed transceivers allowing the field resources to communicate to the office resources via one or more satellites and experts at an information and control center ("ICC") communicate back to field entities. The office resources include the ICC, client and consultant facilities, and one or more public and/or private satellite earth station hubs. The seismic system advantageously facilitates real or near real time transmission of assets, data, voice, and text between the field, the ICC, and client and consulting facilities, thereby providing an efficient seismic operation.

In the preferred embodiment of the invention, five sub-processes or modules preferably are integrated together. These sub-processes include project management, mobilization and demobilization, geodetic surveying, drilling, and seismic data recording. The integration is performed in a systems sense such that a new way of performing the seismic business operation is achieved.

The seismic system of the preferred embodiment uses positional data determined by GPS, or an integration of GPS/IMU (Inertial Measuring Unit), to determine in near real-time, whether the determined set of coordinates of a location in the field (the "actuals") is within specification relative to quality control parameters and with respect to a set of pre-plot coordinates. A mobile unit (e.g., vehicle, sled, backpack) determines its coordinates and sends them along with quality control parameters via satellite communications and the Internet to the ICC, where a knowledge base containing facts and expert rules is used to determine if the actuals are sufficiently close to the pre-plot coordinates given the associated quality control parameters. If a mismatch has occurred, a solution is initially and automatically formulated using the knowledge base, and then reviewed and approved by human experts at the control center. A final decision is then transmitted to the mobile unit in the field, via the Internet and satellite communications, before the field crew leaves the site. All of the information and actions are shared with the appropriate personnel within the group carrying out the work, as well as with the client and their quality control subcontractors, using thin-client Java-based technology over the Internet. Accordingly, personnel in the field can reposition the equipment while they are still at the site of the equipment. The integrated seismic information system is extended to apply to seismic data, permitting information, access information, drilling-related information (e.g., log data), etc.

The various characteristics described above, as well as other features, will be readily apparent to those skilled in the art upon reading the following disclosure.

BRIEF DESCRIPTION OF THE DRAWINGS

A complete understanding of the present invention can be obtained when the following detailed description of the preferred embodiments is considered in conjunction with the following drawings, in which.

NOTATION AND NOMENCLATURE

Certain terms are used throughout the following description and claims to refer to particular system components. As one skilled in the art will appreciate, components may be referred to by different names. This document does not intend to distinguish between components that differ in name but not function. In the following discussion and in the claims, the terms "including" and "comprising" are used in an open-ended fashion, and thus should be interpreted to mean "including, but not limited to . . .". Also, the term "couple" or "couples" is intended to mean either an indirect or direct electrical connection. Thus, if a first device couples to a second device, that connection may be through a direct electrical connection, or through an indirect electrical connection via other devices and connections.

The term "survey" is used in two senses; the first in the context of positioning, i.e., the determination of coordinates, while the second meaning is within a broader context, namely the seismic survey in its entirety which includes all types of information related to the seismic program. The use of the term "survey" will be clear from the context in which it is used.

DETAILED DESCRIPTION OF THE PREFERRED EMBODIMENTS

Figure 1:
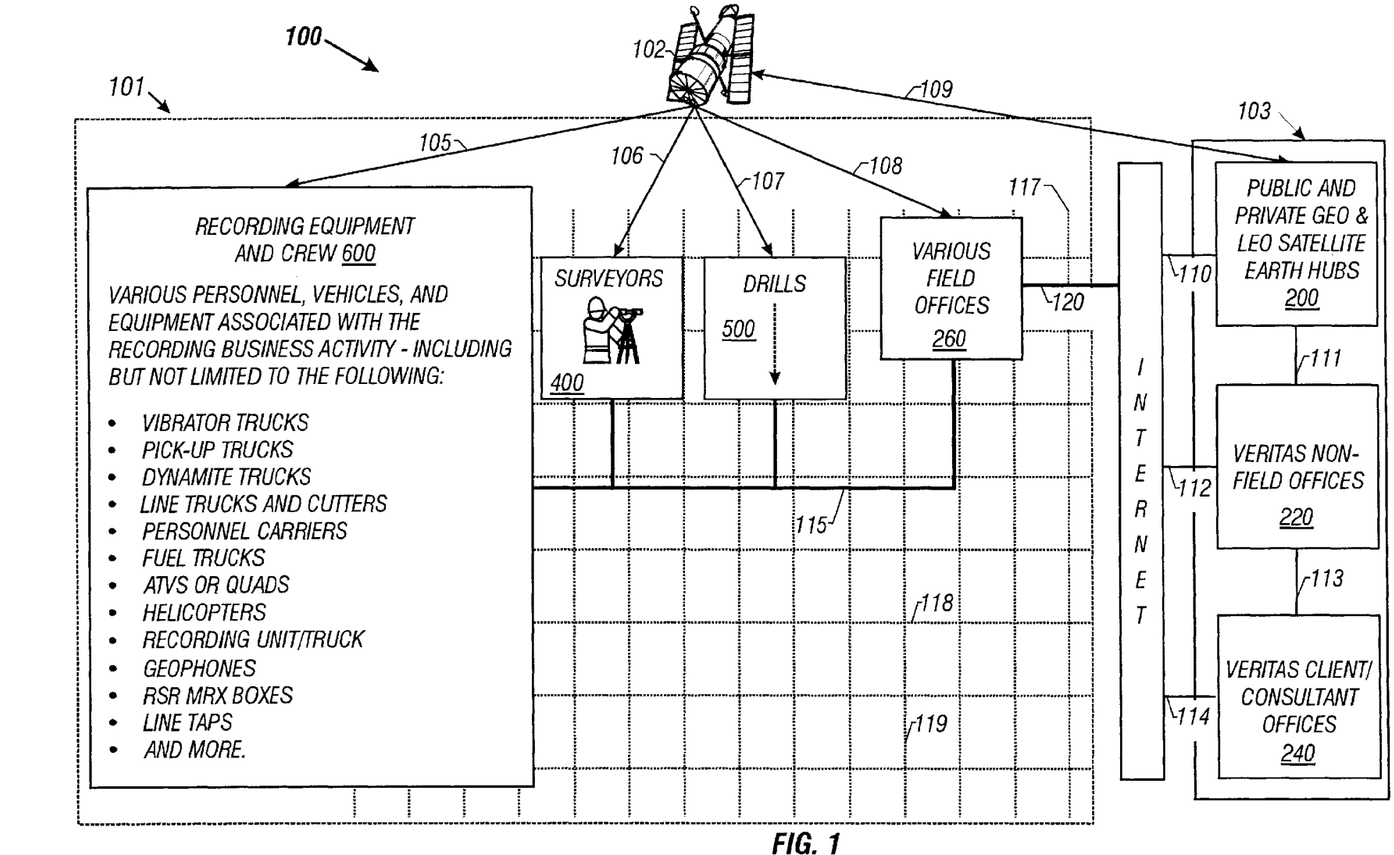
FIG. 1 is a schematic diagram of the overall seismic system network in accordance with the preferred embodiment of the invention.

Referring now to FIG. 1, seismic mobile information and control (Seis-MICS™) system 100 is shown in accordance with the preferred embodiment of the invention. The term "resources" or "assets" used throughout this description generally refers to equipment, software and personnel, unless otherwise stated. As shown, seismic system 100 includes three general groups of resources. A first group of resources includes the field resources 101 located on the site of the seismic project or in the general vicinity of such a project. A second group of resources includes one or more satellite resources 102 located in orbit around the earth. A third group of non-field office resources 103 is located separate from the field 101 and preferably, although not necessarily, located in cities where high speed Internet connections are available. The field resources 101 are in communication with satellite resources 102 via wireless communication links at communication speeds between about 2.4 Kilobits per second (Kbps) and 10 Megabits per second (Mbps) or greater. The satellite resources 102 transmit data to the non-field office resources 103 via wireless transmission links at speeds between about 2.4 Kbps and 10 Mbps or greater. Therefore, field resources 101 communicate with the non-field office resources 103 via wireless communication links using satellite resources 102.

The field resources 101, which include seismic sources along source lines 117, receivers on receiver lines 118, and other equipment and personnel described below, are located within an area typically between 5 and 400 square miles in size. The field 101 generally is defined as the area around the source 117 and receiver 118 lines and includes the project grid 119. The project grid 119 is designed by the geophysicist or 3D design group, not specifically shown, which is preferably located in the non-field office resources 103. In some circumstances, some of the field 101 resources, such as field offices 260, are located hundreds of miles or more away from the field 101.

Figure 2A:
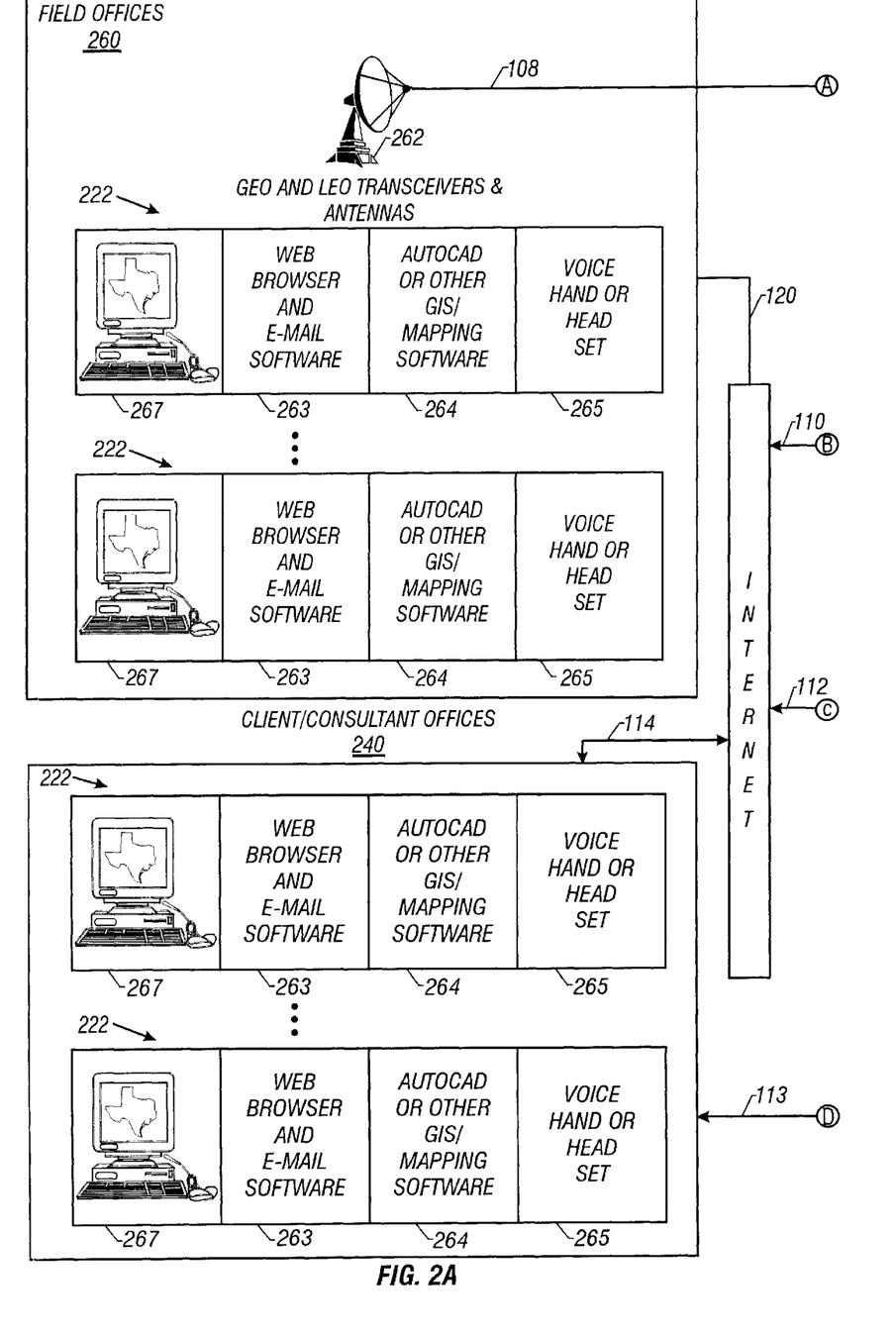
FIG. 2 shows various components used in the project management solution implemented in the seismic system of FIG. 1.
Figure 2B:
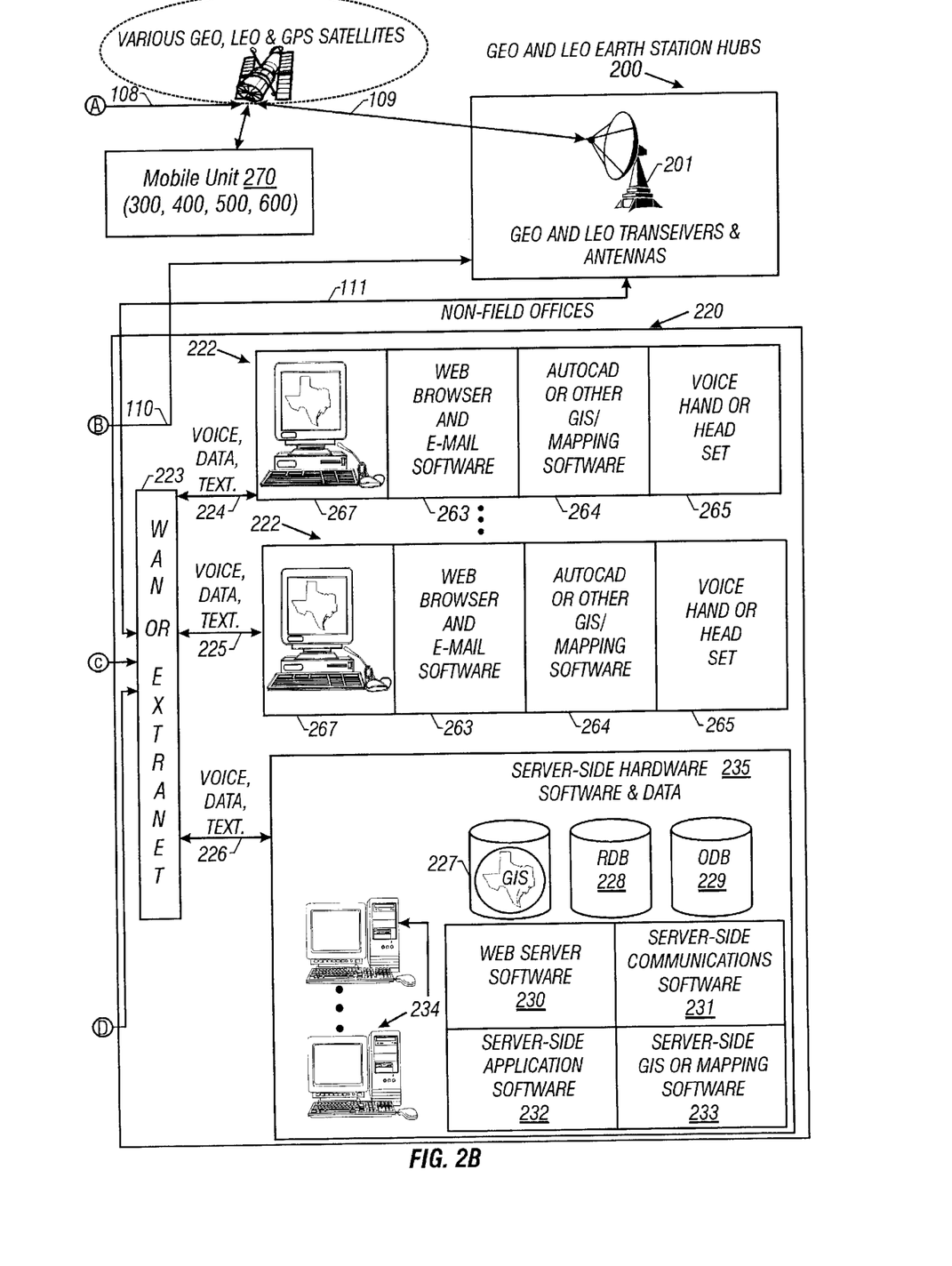

Within the field 101 resources, there are four groups of resources: various field office resources 260, surveying resources 400, drilling resources 500, and recording resources 600. Each of these resources preferably are in communication with one another either via a local wireless link 115 or via the satellite resources 102 and the non-field office resources 103. Each of the resources 400, 500, and 600 are detailed in FIGS. 4, 5, and 6 respectively. The non-field resources 103 and field office resources 260 are shown in FIG. 2 in the context of the project management solution.

Various types of data preferably is transmitted between the field resources 101 and the non-field resources 103. Table 1 provides examples of the types of data that pass between the field resources 101 and the non-field office resources 103 via the satellite resources 102.

TABLE 1

Examples of Data Types Passing Between the Field and the Non-Field Office Resources (est. 10 crews)

| Data | Total Size | Update Frequency | Update Size (each) | Max. Preferred Latency |
|---|---|---|---|---|
| Actual Source & Receiver Points | 10 MB | 200/day | <1 KB | 10 min |
| Adjusted Theoreticals | 10 MB | 100/day | <1 KB | 10 min |
| Drill Report | 5 MB | 40/day | <1 KB | 10 min |
| Digital Terrain Model | 20 MB | 1/day | Up to 10 MB | 10 min |
| Inventory Update | n/a | 30/day | <1 KB | 30 sec |
| Location Poll | n/a | 5/day | <1 KB | 1 min |
| Location Reply | n/a | 5/day | <1 KB | 1 min |
| Message | n/a | 10/day | <1 KB | 10 min |
| Access Obstructions | 5 MB | 100/day | <1 KB | 8 hrs |
| Profit & Loss Inputs | 100 MB | 2/day | 4–8 KB | 12 hrs |
| Profit & Loss Reports | | | | |
| Priority Message | n/a | 10/day | <1 KB | 30 sec |
| Receiver Actuals | 5 MB | 200/day | <1 KB | 10 min |
| Source Actuals | 5 MB | 40/day | <1 KB | 10 min |
| Survey Control Network | 10 MB | 1/week | up to 10 MB | 10 min |
| Theoretical Source & Receiver Pts | 10 MB | 200/day | <1 KB | 10 min |
| Tracking Report | n/a | 5–100/day, varying | <1 KB | 10 min |
| Seismic Data | 100 GB | 1/day | 3–6 GB | 24 hrs |
| Seismic Data Quality Control | n/a | 5/day | 200 KB | 30 min |

As shown in Table 1, each data type has a preferable total size, update frequency, size per update, and maximum latency per update.

Along with Table 1, FIG. 1 provides a view of the overall Seis-MICS system 100. Seis-MICS system 100 preferably solves five fundamental business process problems within an overall seismic project. In accordance with the preferred embodiment, one or more technology solutions (or "modules" or "sub-processes") are integrated together to solve various of the business process problems noted above. The following text and related figures describe the five modules preferably used to provide an efficient seismic operation:

Module 1: Project Management Module
Module 2: Mobilization Demobilization Module
Module 3: Surveying Module
Module 4: Drilling Module
Module 5: Recording Module Certain components of each module can be implemented independently of the other modules, and in any order, permitting the overall seismic system 100 to be brought on line incrementally. Further, the modules can be implemented in different orders, permitting the system 100 to be implemented according to business needs and as resources permit. The following discussion addresses each of the modules in the order provided above. This order, however, does not imply that one module is more important than other modules.

Module 1: Project Management Module

Referring now to FIGS. 1 and 2, the preferred embodiment of the invention includes a project management module which permits data that is collected in the field to be quality controlled ("QCed") within hours, minutes, or seconds by expert project managers and other domain experts and personnel located at the non-field office resources 103. Furthermore, the project management module allows for a significant decrease in the duplication of data collection and distribution efforts by storing the data preferably only once and making it available to authorized users via various wireline connections and wireless communication links. The data includes data in various formats such as textual, numerical, mapping, graphical, video, voice and audio formats. This efficient collection, storing, and distribution of data results in significant costs savings and improved customer relations.

The project management module advantageously also permits the monitoring of the other modules. In this context, Seis-MICS system 100 includes an Information and Control Center (ICC). The ICC is not necessarily one physical office where the monitoring is performed. Instead, the ICC can be a virtual control center implemented on a network such as the Internet where access can be restricted by security and authorization requirements.

Referring now to FIG. 2, the preferred embodiment of the project management module generally includes four groups of resources: field office resources 260; public and private GEO and LEO earth station hubs 200; non-field office resources 220; and client/consultant office resources 240. The non-field office resources 220 includes server-side hardware, software, and data storage 235 which preferably includes: Geographic Information System (GIS) 227, such as is vended by ESRI and Autodesk; a Relational Database Management System (RDBMS) 228, such as is vended by Microsoft and Oracle; an Object DataBase Management System (ODBMS) 229, such as is vended by Oracle and Versant; web server software 230 such as is vended by Netscape and Microsoft; server-side communications software 231; server-side application software 232; server-side GIS or mapping software 233 such as is vended by ESRI and Autodesk; and Windows and Unix based server computers or workstations 234. The purpose of the GIS 227, RDBMS 228, and ODBMS 229 is to store data that is collected from the field and created in order to aid the project management solution. Some examples of such data are topographic mapping data, survey data, seismic QC data, location data for the vehicles and personnel in the field, text messages, access data, third party utility data, drilling data, inventory data, personnel data, Profit & Loss (P&L) data on other data. Preferably, all or much of the data associated with one or more seismic projects is stored in the components 227, 228, 229, and other kinds of electronic storage entities such as flat files (not shown). In addition to storing the data, the components 227, 228, 229 communicate with the server-side communications software 231, the server-side GIS or mapping software 233, and the server-side application software 232 to facilitate serving of data to and receiving commands and data from user computers 222 and other components such as those used in the surveying module (see FIG. 4).

The user workstations 222 comprise Unix-based and Microsoft-based computers and preferably include various software packages installed on them including a web browser and e-mail software 263, preferably vended by Microsoft and Netscape, mapping software 264, preferably vended by Autodesk and ESRI, and voice and video communications unit 265. The voice and video communications unit 265 preferably includes software and a microphone, speaker, and/or camera. These devices preferably facilitate two-way communications between user workstations 222 and personnel, vehicles, and offices located in the field. Furthermore, user workstations 222 permit viewing and editing of data stored in the server-side hardware, software, and data storage 235. The user workstations 222 preferably can be located in any suitable site such as in the non-field office resources 220 as shown or the client/consultant office resources 240 and field office resources 260.

Referring still to FIG. 2, the Wide Area Network or Extranet 223 preferably couples to user workstations 222, server-side hardware, software, and data storage 235 and a communication link 116 which preferably is the Internet. This configuration effectively provides all authorized users access to the server-side hardware, software, and data storage 235. User workstations 222 in the field office resources 261 or client/consultant office resources 240 are connected to the server-side hardware, software, and data 235 via wireless links 108 and 109, the Internet 116 and links 110, 114, and 120 and dedicated or shared wireline connection 113. The GEO and LEO transceivers and antennas 201 may be manufactured by various companies including Panasonic, Magellan, Mobile Satellite Communications, Motorola, Cush Craft, and others, and permit communication with the satellites 102.

In the field (not shown in FIG. 2) there are various mobile personnel and equipment. These mobile units, 270 (labeled as 300, 400, 500, and 600 in other figures), labeled generically as in FIG. 2, preferably tie into the project management module via GEO or LEO satellite communications link. Data from these mobile units 270 is stored in the server-side hardware, software, and data storage 235 and made available to various user workstations 222 based on authorization of users. Data is sent to these mobile units 270 via other mobile units or via any number of user workstations 222. Furthermore, data can be sent to the mobile units 270 via the server-side communications software 231 based on the initiation of Quality Control (QC) software which is part of the server-side application software 232 or other software shown or not shown in FIG. 2. All references to data generally include data, text, and/or voice.

The project management module also preferably provides quality control functionality which preferably is performed via a layer within the project management solution called the "QC system." Within the QC is a subsystem associated with the surveying solution called the surveying QC system. The surveying QC system is described as an example of a QC subsystem. The surveying QC system, (not specifically shown) is implemented in the server-side hardware, software, and data storage 235. This system facilitates automatic and user assisted QC functions on the data that has been collected from the field and transmitted to the server-side hardware, software, and data storage 235, such as magnetic tape or hard disk.

The surveying QC system has as its main function the determination of the correctness of a computed set of coordinates as compared to its own statistical measures (e.g., standard deviations) and its corresponding set of theoretical pre-plot coordinates. The former can be said to be an internal check for consistency or precision, while the latter is an external check of where one should be in the field relative to a planned set of coordinates.

The sets of determined coordinates are assessed for (a) mobile vehicles and backpacks, and (b) stationary integrity monitoring stations in the project area such as the GPS base stations or check points, the coordinates for which are known.

Types of Coordinates or Points
Mobile Vehicles and Backpacks

A set of coordinates can be computed for a given instant in time from GPS and GPS/INS (Inertial Navigation System) observations made from or in a mobile vehicle or backpack. These computed coordinates ("actuals") are compared to their corresponding set of pre-plot coordinates or destination coordinates to determine if the destination reached is within positional specifications.

As well, destination coordinates are assigned coordinates during the mobilization and demobilization stages of the seismic operation. Their required accuracies are usually relatively low (few to tens of meters) as they relate to destination points such as a wharf for a pickup, a campsite for delivery/pickup, or a staging area for deployment of vibrator vehicles and track vehicles laying out geophones.

Preplot Coordinates

Preplot coordinates on the other hand, are part of the seismic data acquisition plan and preferably are navigated in the field to an accuracy of about 1 m. Drill holes and receiver (geophone) positions fall into the same category. Preferably, the system determines the actual coordinates of these points within about 1 m, and the difference between the actual coordinate value and the corresponding preplot value for these critical points should be about 1 m as well.

Integrity Monitoring Stations and Check Points

Integrity monitoring stations (not specifically shown) are placed at points at which the coordinates are known to a high degree of accuracy akin to that of the control survey network itself. An integrity monitoring station could be part of the control network for the project. The accuracy preferably is approximately a standard deviation of a few centimeters to 10 centimeters.

The choice of location of an integrity monitoring station is such that it should be representative of the same conditions encountered by the mobile vehicles and backpacks in the seismic survey area. The reason for this location criteria of integrity monitoring stations (with known coordinates) is that if the integrity monitoring station is functioning to specifications, then so should the mobile units (with unknown coordinates). Often, the integrity monitoring stations are simply check points with known coordinates that the surveyor visits at the beginning and end of the shift to determine whether the equipment is operating to specifications.

Quality Control

Quality control of point-related positional information is performed as a function of two basic groupings of information, namely:

the precision, accuracy, and reliability of the solution for the coordinates at any given epoch in time; and the comparison of the coordinates from the latest solution with their corresponding pre plot coordinate values.

Precision, Accuracy, and Reliability

The precision of the computed coordinates are given in terms of the standard deviations. These precision measures can only be considered true measures of accuracy if there are no biases in the GPS measurements. Biases can be removed by the normal least squares adjustment (estimation) processes if the solution is reliable. Reliable solutions are characterized by favorable internal and external reliability measures, which are normally not computed by most GPS manufactures. Thus, a sufficient measure to indicate the reliability of the solution is to set limits on two additional parameters: the number of satellites (5 is generally accepted as the minimum for a reliable solution) and the DOP (Dilution of Precision) values which by themselves may not indicate a reliable solution, but simply indicate acceptable geometry (relative position of the point being determined and the positions of the satellites observed). In combination with the number of satellites, DOP values are suitable measures of reliability used in the preferred embodiment of the invention. The following provides an example of DOP values.

With an HDOP (Horizontal DOP) of 2 and number of satellites 5 or greater, the solution is reliable (elimination of the systematic errors is possible), and thus the solution and its standard deviations indicate an accurate solution (i.e., not biased; coordinates are not shifted). For the case of HDOP 2 and number of satellites of 5 or greater, if the standard deviations in latitude and longitude are less than 0.41 m (corresponding to a 95% 2D confidence region for the horizontal position), then the horizontal specifications are said to have been met. Similarly, for a VDOP (vertical DOP) of 2 and number of satellites of 5 or greater, if the standard deviation in height is less than 0.51 m (corresponds to a 95% 1 D confidence interval of 1 m), then the height specification is said to be met.

The above exemplary values are rules of thumb and can be chosen to be more or less stringent. Seismic clients may choose the value of the DOPs for a given project and set the maximum for the PDOP (Position DOP) to be typically between 4 and 6. These client-specified parameters are input values to the Seis-MICS QC Module.

Relative to Pre Plots

Since the field backpacks are used to navigate to a set of pre-plot coordinates, the computed-final coordinates will be close to the set of pre plot coordinates. The reason that they may not be exactly the same is that, while navigating and being guided, the rovers and GPS backpack operators may stop short of the pre-plot coordinates. Another reason is that while stopped at the pre-plot coordinates, additional GPS observations may be collected causing the solution to change from that used in guiding the backpack to a stop. As long as the linear separation between the two sets of coordinates is less than about 1 m (depending upon the client), it can be said that the actuals and pre-plot values are substantially the same with a confidence of 95%. In other words there is a 95% certainty that there is no significant difference between the two sets of coordinates.

It is also possible to have a difference between actuals and prelots reaching about 5 m (depending on client). This is allowed because it is understood that this separation is only a slight distortion of the seismic grid. The accuracy of the actuals, however, preferably is in accordance with the accuracy specifications (e.g., 1 m) discussed earlier.

A few off-set rules are predetermined by the client (e.g. "X" number of meters perpendicular to where the point should have been placed) are used to move the point around obstacles, such as the following: Also, setting the maximum radius of error between a pair of preplot and actual set of coordinates is part of this QC module and is set by the client as part of the positional accuracy specifications, e.g., 1 meter in latitude, longitude and height.

The same can not be said for the vertical coordinate, as there is not a second value of the height for comparison. For this reason, a height profile is plotted along with the 95% confidence interval bar for each height value. These are inspected to make sure that there are no jumps or unreasonable discontinuities in either. To handle this filtering process, it is preferable to input suitable terrain roughness parameters (e.g., 2 m, 5 m, 10 m) for the job. If the height difference between two contiguous points of e.g., 60 m spacing is greater than say 5 m, it would be flagged for inspection.

Also, good height determination is indicated by a high number of satellites and a good VDOP value (e.g., 2) and a small standard deviation in height (e.g., 0.51 m) which corresponds to a 95% confidence interval of 1 m. This 1 m value can be interpreted to mean that the true value for the height is somewhere between the computed height value and +/−1 m with 95% confidence.

The surveying QC system is part of the overall Seis-MICS QC system. The overall Seis-MICS QC system is related to all the following modules implemented to solve specific business process problems.

Module 2: Mobilization and Demobilization Module

Figure 3:
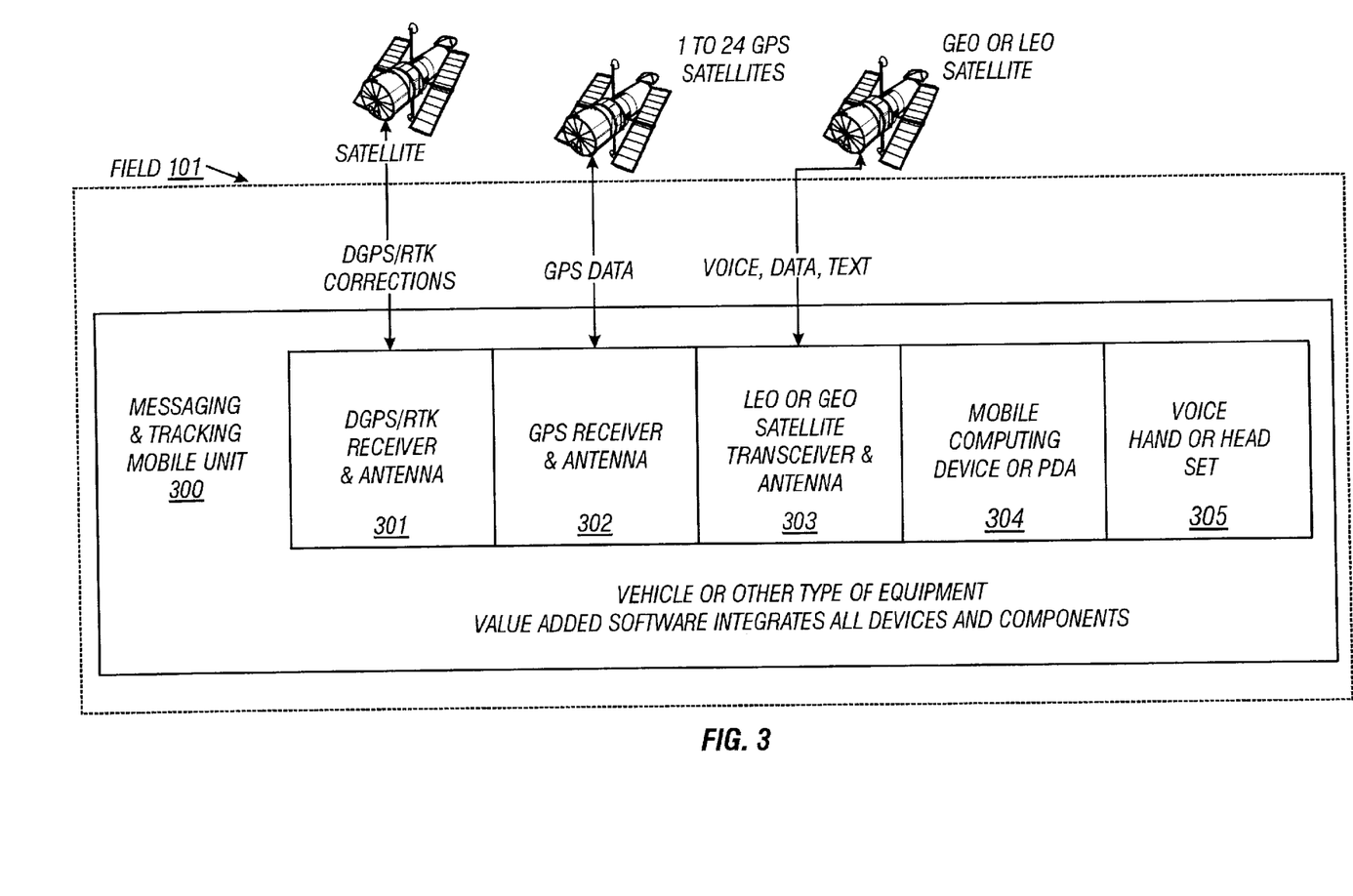
FIG. 3 shows various components used in the mobilization and demobilization solution implemented in the seismic system of FIG. 1.

The mobilization and demobilization module facilitates, via the project management solution, the management of the mobilization and demobilization of personnel and equipment to and from a seismic project site. This solution results in increased efficiency and improved customer relations. Many different types of vehicles and personnel will be equipped with satellite messaging and tracking units 300. Some examples of these vehicles are vibrator trucks, transport vehicles, helicopters, and more. In addition, various personnel may register for the day's work via a registration system that uniquely identifies the person via thumb print or other means.

FIG. 3 is the preferred embodiment of the mobilization and demobilization solution. Personnel, vehicles, or other types of equipment, may be equipped with a satellite messaging and tracking unit 300 which may contain all or some of the components or devices shown in FIG. 3. All or some of the five components comprising the messaging and tracking unit 300 are coupled to allow mobile units to communicate with other mobile units, field offices 260, non-field offices, and client/consultant offices. The DGPS/RTK receiver and antenna 301 receives correction data from a satellite or some other network and is manufactured by companies such as Omnistar, Racal, SatLoc, DCI, and other wide area correction providers. The GPS receiver and antenna 302 receives a signal from the Global Positioning System. Components 302 and 301 determine the position of the mobile unit to an accuracy of between about 1 cm to 100 meters. The mobile computing device or PDA 304 is used as a Man Machine Interface (MMI) between the other components in 300 and the human operator. Mobile computing device 304 is used to view messages from other mobile units, various user workstations 222, the server-side hardware, software, and data store 235. Mobile computing device 304 can also be coupled to a voice handset or headset 305 to facilitate voice communications between the human operator of component 300 and any other person in the world. Satellite transceiver 303, manufactured by such companies as Stellar and Motorola, is used to receive and transmit data, voice, and text between the satellite messaging and tracking unit 300 and any other computer or person associated with the seismic system.

Module 3: Surveying Solution

Figure 4:
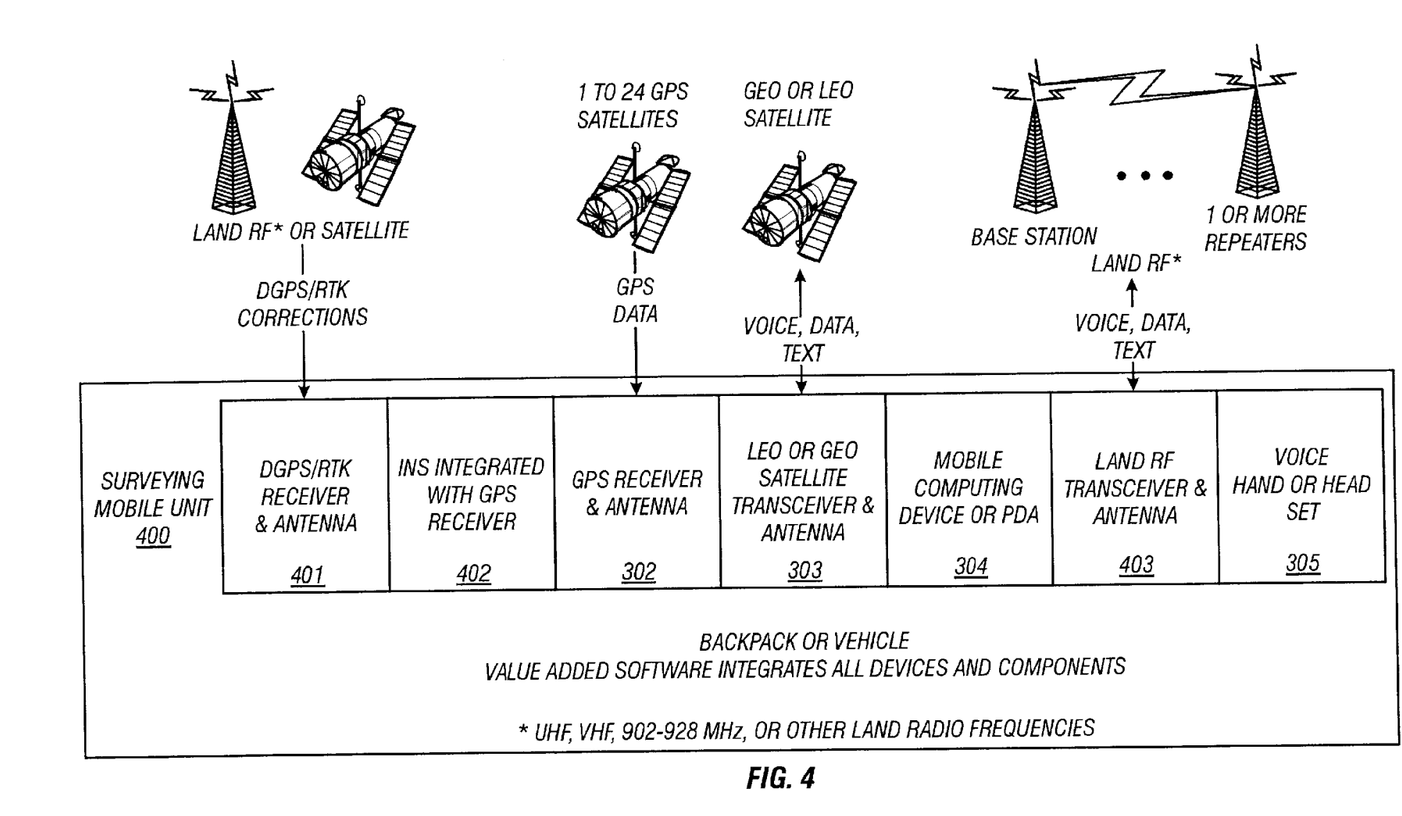
FIG. 4 shows various components used in the surveying solution implemented in the seismic system of FIG. 1.

Referring again to FIG. 1, the surveying solution allows for the rapid QC of the project grid 119. FIG. 4 shows the preferred embodiment of the surveying solution module. The surveying mobile unit 400 preferably includes components that are the same as or similar to those shown in other figures. Mobile unit 400 may be comprised of all or some of the following components: DGPS/RTK receiver and antenna 401; Inertial Navigation System (INS) 402; GPS receiver and antenna 302; LEO or GEO satellite transceiver and antenna 303; mobile computing device or PDA 304; Land RF transceiver and antenna 403; and voice handset or headset 305.

The DGPS/RTK receiver and antenna 401 typically receives correction data from a local area RTK system, manufactured by such companies such as Pacific Crest and Trimble, setup by field personnel within the area of the project grid 119. However, it is possible to use a satellite or some other network that is operated by companies such as Omnistar, Racal, SatLoc, DCI, and other wide area correction providers. Typically, these companies do not provide services suitable for sub-meter accuracy, but they are moving in that direction. The GPS receiver and antenna 302 receives a signal from the Global Positioning System. Receivers and antennas 302 and 301 couple to determine the position of the mobile unit to an accuracy of between 1 cm to 10 meters. The GPS receiver and antenna 302 is also coupled with an inertial navigation system ("INS") 402 for the purpose of maintaining accurate position data while environmental conditions preclude accurate reception of data from components 302 and 401. The INS 402 is manufactured by companies such as Honeywell and Litton and provides a way to accurately determine position without the use of the GPS. The mobile computing device or PDA 304 is used as one Man Machine Interface (MMI) between the other components in 400 and the human operator. Mobile computing device 304 is used to view messages from other mobile units and various user workstations 222. Mobile computing device 304 can be coupled to a voice handset or headset 305 to facilitate voice communications between the human operator of component 400 and any other person in the world. Components 303 and 304 are used to receive and transmit data voice and text between surveying mobile unit 400 and any other computer or person associated with the seismic system 100. Satellite transceiver 303 and land transceiver 403 are manufactured by such companies as Stellar, Quake, Motorola, and Pacific Crest.

The project grid is either laid out or staked separately from the drilling and recording or it may be done simultaneously. When done separately, the surveyors move ahead of the drilling and recording equipment. The surveyors typically carry the surveying mobile unit 400 in a backpack solution. Using guidance software residing in the survey unit 400, the surveyors navigate to pre-plot or theoretical points determined by the 3D design crew or other domain experts. When close to a point the surveyor tags or records the exact location and places a physical at that location or assigns a virtual marker. This marker is then navigated to at a later date by drilling and recording personnel and equipment. When done simultaneously, the drilling and recording personnel and equipment do not navigate to markers placed by surveyors, but to the pre-plot or theoretical points determined by the 3D design crew or other domain experts. When close to the pre-plot point, the drilling and recording personnel and equipment mark the exact location of the activity performed over the point—the activity referring to the drilled whole, vibrator, or placed geophones and other equipment. In other words, the drilling and recording equipment can either navigate to pre-surveyed points on the project grid 119 or they can navigate to a pre-plot point (point that has not yet been surveyed and staked, but has been designated in the project planning phase of the process by the 3D design group or other domain experts). In either of these two cases, pre-plot or theoretical points must be navigated to, surveyed, recorded, and stored in the server-side hardware, software, and data store 235. Once in the server-side hardware, software, and data store 235 the survey data can be QCed by the 3D design group, other domain experts, and the server-side application software 232. The surveying solution yields reduces costs and improves customer relations.

Module 4: Drilling Solution

Figure 5:
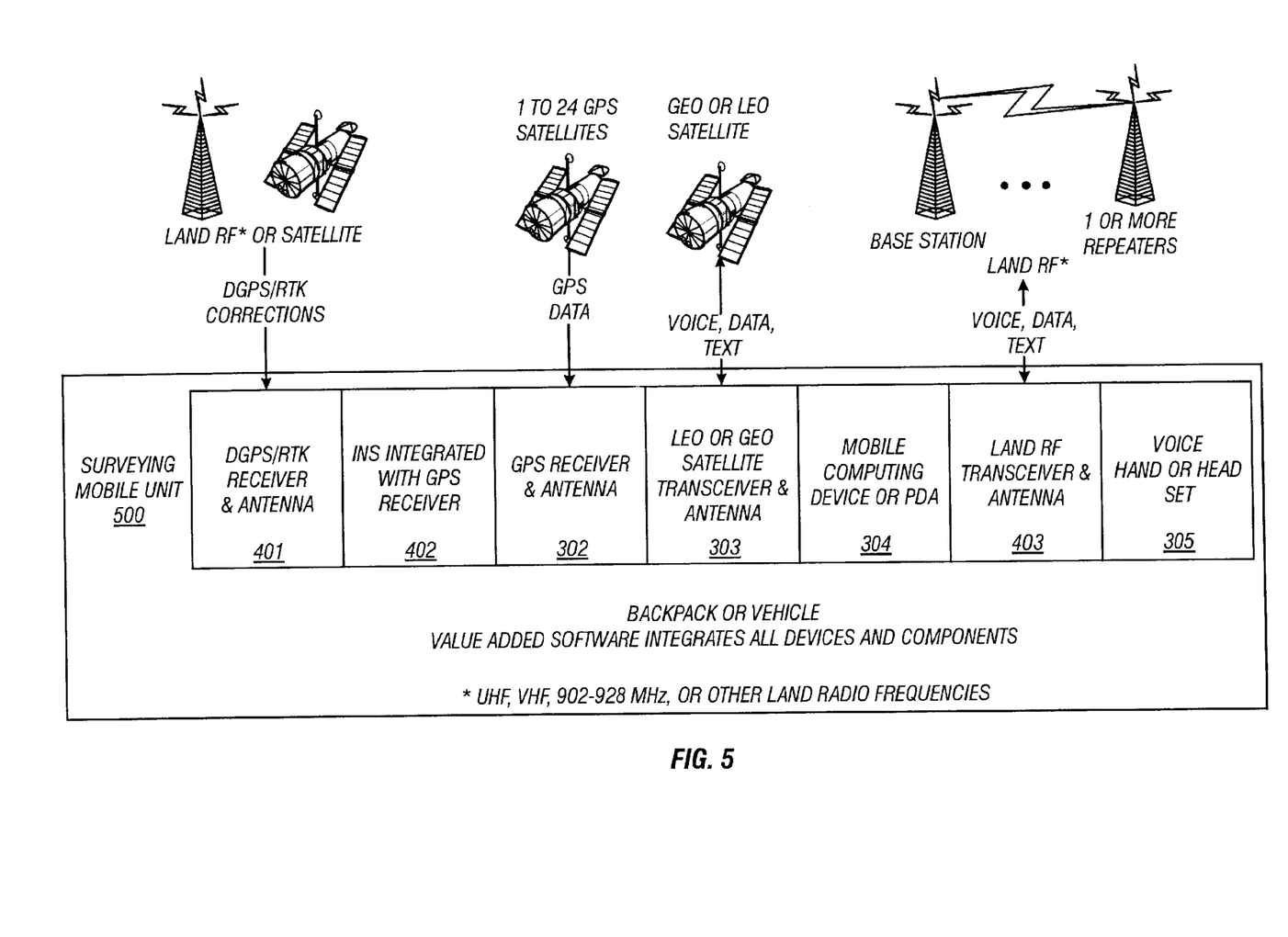
FIG. 5 shows various components used in the drilling solution implemented in the seismic system of FIG. 1.

In conventional seismic systems, drill hole information was logged by hand and given to a clerk in a field office 260. This information was QC'd a day or more after the hole was drilled. The delay and associated data integrity problem resulted in increased costs. With the implementation of the preferred seismic system 100 described herein, the data is transmitted from the drilling mobile unit 500 to the server-side hardware, software, and data store 235 in the non-field office 220 within seconds, minutes, or hours. This reduction in data latency results in reduced costs and improved customer relations.

FIG. 5 shows the preferred embodiment of the drilling solution. The drilling mobile unit 500 has some components that are the same as or similar to those shown in other figures. Drilling mobile unit 500 may be comprised of all or some of the following components: DGPS/RTK receiver and antenna 401; Inertial Navigation System (INS) 402; GPS receiver and antenna 302; LEO or GEO satellite transceiver and antenna 303; mobile computing device or PDA 304; Land RF transceiver and antenna 403; and voice handset or headset 305.

The DGPS/RTK receiver and antenna 401 typically receives correction data from a local area RTK system, manufactured by such companies as Pacific Crest and Trimble, setup by field personnel within the area of the project grid 119. However, it is possible to use a satellite or some other network that is operated by companies such as Omnistar, Racal, SatLoc, DCI, and other wide area correction providers. The GPS receiver and antenna 302 receives a signal from the Global Positioning System. Receivers and antennas 302 and 301 couple together to determine the position of the mobile unit to an accuracy of between about 1 cm to 10 meters. The GPS receiver and antenna 302 is also coupled with the INS 402 for the purpose of maintaining accurate position data when environmental conditions preclude accurate reception of data from satellite receivers 302 and 401. The mobile computing device or PDA 304 is used as one MMI between the other components in the drilling module 500 and the human operator. Mobile computing device 304 is used to view messages from other mobile units and various user workstations 222. Mobile computing device 304 can be coupled to a voice handset or headset 305 to facilitate voice communications between the human operator of component 500 and any other person in the world. Components 303 and 304 are used to receive and transmit data voice and text between drilling mobile unit 500 and any other computer or person associated with the seismic system 100.

Module 5: Recording Solution

Figure 6:
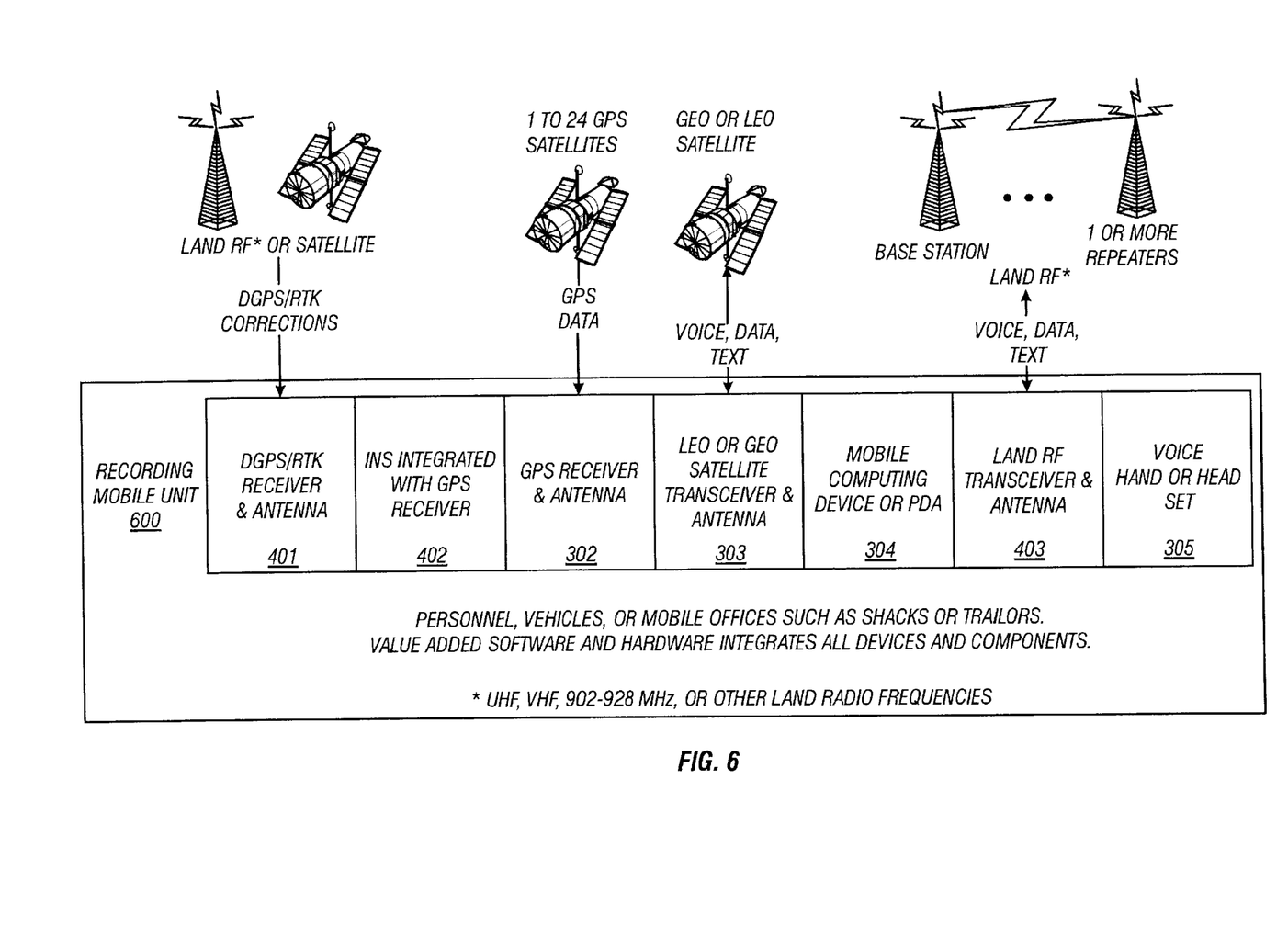
FIG. 6 shows the various components used in the recording solution implemented in the seismic system of FIG. 1.

FIG. 6 is the preferred embodiment of the recording solution. As shown recording unit 600 preferably is a mobile device that comprises the various components shown.

Recording mobile unit 600 preferably is used during the recording activity to record and transmit information to the non-field assets. Although the recording business process has similar characteristics to the surveying and drilling process, some differences exist. In general, the recording process has more stringent technical requirements. One difference is the real-time communications is required between the various recording mobile units 600 and those in charge of managing the recording process. The managers can be in the field 101, in a field office 260, in a non-field office 220, and in a client/consultant office 240. An example of the requirement for real-time communications is if a particular piece of equipment on the active patch breaks down, the recording observer or the recording crew manager can dispatch the nearest vehicle that has that particular piece of equipment in its inventory. This dispatching and response preferably is substantially immediate and not with a substantial delay. As another example, the vibrator trucks are connected together and to field offices 260 and non-field offices for general and precise location management. For precise location management, there are occasions where more than one vibrator truck is to act as a source of energy over a source point. Therefore, the vibrator trucks must align themselves in such a way that the centroid of all of their pads are located over the source point. Again, this precision positioning and associated communications must be done with very little latency. The recording solution implements this stringent communications requirement either via a non-satellite based land RF 403 system or via a real-time satellite system such as Globalstar, or Inmarsat. Table 2 gives an exemplary list of the different types of equipment that may be equipped with a recording mobile unit 600.

TABLE 2

Types of equipment that may be equipped with a recording mobile unit 600.

Equipment Type

- Vibrator Trucks
- Pick-up Trucks
- Dynamite Trucks
- Line Trucks and Cutters
- Personnel Carriers
- Fuel Trucks
- ATVs or QUADs
- Helicopters
- Recording Truck and or Recorder
- Geophones
- RSR and MRX Boxes
- Line Taps The vehicles and other equipment may be equipped with a recording mobile unit 600. Depending on the specific use of the piece of equipment data, text, and voice communications are implemented.

Referring to FIG. 6, the recording mobile unit 600 has some components that are the same as or similar to those shown in other figures. Mobile unit 600 may be comprised of all or some of the following components: DGPS/RTK receiver and antenna 401; Inertial Navigation System (INS) 402; GPS receiver and antenna 302; LEO or GEO satellite transceiver and antenna 303; mobile computing device or PDA 304; Land RF transceiver and antenna 403; and voice handset or headset 305.

The DGPS/RTK receiver and antenna 401 typically receives correction data from a local area RTK system, manufactured by companies such as Pacific Crest and Trimble, setup by field personnel within the area of the project grid 119. However, it is possible to use a satellite or some other network that is operated by companies such as Omnistar, Racal, SatLoc, DCI, and other wide area correction providers. Typically, these companies don't provide services suitable for sub-meter accuracy, but they are moving in that direction. The GPS receiver and antenna 302 receives a signal from the Global Positioning System. Component 302 and 301 couple to determine the position of the mobile unit to an accuracy of between 1 cm to 10 meters. The GPS receiver and antenna 302 is also coupled with the INS 402 for the purpose of maintain accurate position data while environmental conditions preclude accurate reception of data from components 302 and 401. The mobile computing device or PDA 304 is used as one MMI between the other components in 600 and the human operator. Component 304 is used to view messages from other mobile units and various user workstations 222. Component 304 can be coupled with a voice handset or headset 305 to facilitate voice communications between the human operator of component 600 and any other person in the world. Components 303 and 403 are used to receive and transmit data voice and text between recording mobile unit 600 and any other computer or person associated with the seismic system 100.

As described above, the preferred embodiment of the invention integrates together five modules include project management, mobilization and demobilization, geodetic surveying, drilling, and seismic data recording. The integration is performed in a systems sense such that a new way of performing the seismic business operation is achieved to permit virtually real-time communication to exist between field assets and non-field assets.

The land seismic, mobile tracking and control system uses positional data determined by GPS, or an integration of GPS/IMU (Inertial Measuring Unit), to determine in near real-time, whether the determined set of coordinates of a location in the field (the "actuals") is within specification relative to quality control parameters and with respect to a set of pre-plot coordinates. A mobile unit determines its coordinates and sends them along with quality control parameters via satellite communications and the Internet to the ICC, where a knowledge base containing facts and expert rules is used to determine if the actuals are sufficiently close to the pre-plot coordinates given the associated quality control parameters. If a mismatch has occurred, a solution is initially and automatically formulated using the knowledge base, and then reviewed and approved by human experts at the control center. A final decision is then transmitted to the mobile unit in the field, via the Internet and satellite communications, before the field crew leaves the site. All of the information and actions are shared with the appropriate personnel within the group carrying out the work, as well as with the client and their quality control subcontractors, using thin-client Java-based technology over the Internet. Accordingly, personnel in the field can reposition the equipment while they are still at the site of the equipment. This concept of an integrated seismic information system is extended to apply to seismic data, permitting information, access information, drilling-related information, etc.

The preferred embodiment of the invention solves the shortcomings noted above with respect to conventional seismic survey methodologies.

What is claimed is:

1. A seismic system, comprising:
   a plurality of field equipment usable in the vicinity of an area to be seismically surveyed, each of said plurality of field equipment including a satellite transceiver;
   an earth station hub coupled to said plurality of field equipment through one or more communication satellites; and a workstation coupled to said earth station hub; said workstation and field equipment in communication with each other via said earth station hub;

further including portable personal data assistants and an antenna coupled to a satellite transceiver located in the field, said PDA communicates through the satellite transceiver to the earth station hub.

2. The seismic system of claim 1 further including a positioning subsystem comprising ground-based satellite receivers that receive signals from positioning satellites to determine receiver position data and transmit said receiver position data via said communication satellite to the earth station hub.

3. The seismic system of claim 1 further including connections to an on-line network to permit predetermined persons access to various seismic information.

4. The seismic system of claim 3 wherein said on-line network comprises the Internet.

5. The seismic system of claim 1 further including an uplink transceiver configured to communicate with said communication satellites.

6. The seismic system of claim 5 further including a wireless base station transceiver for communicating to a first set of field equipment, said wireless base station transceiver coupled to said uplink transceiver to provide communication between the first set of field equipment and the earth station hub.

7. The seismic system of claim 1 further including GPS receivers to compute position data of selected field sites.

8. The seismic system of claim 7 wherein said position data is communicated in near real time to said earth station hub.

9. The seismic system of claim 1 further comprising:
a satellite receiver that receives signals from a positioning satellite to determine position of a site in a field location;
a portable device including memory that stores a predetermined set of position data; and
a quality control software module that compares position determined by said satellite receiver to the predetermined set of position data.

10. A seismic system, comprising:
a plurality of field equipment usable in the vicinity of an area to be seismically surveyed, each of said plurality of field equipment including a satellite transceiver;
an earth station hub coupled to said plurality of field equipment through one or more communication satellites;
a workstation coupled to said earth station hub; said workstation and field equipment in communication with each other via said earth station hub; and
an antenna tower located in the field to provide communication with various of said plurality of field equipment, said antenna tower coupled to a satellite transceiver.

11. The seismic system of claim 10 further including a positioning subsystem comprising ground-based satellite receivers that receive signals from positioning satellites to determine receiver position data and transmit said receiver position data via said communication satellite to the earth station hub.

12. The seismic system of claim 10 further including connections to an on-line network to permit predetermined persons access to various seismic information.

13. The seismic system of claim 12 wherein said on-line network comprises the Internet.

14. The seismic system of claim 10 further including an uplink transceiver configured to communicate with said communication satellites.

15. The seismic system of claim 14 further including a wireless base station transceiver for communicating to a first set of field equipment, said wireless base station transceiver coupled to said uplink transceiver to provide communication between the first set of field equipment and the earth station hub.

16. The seismic system of claim 10 further including GPS receivers to compute position data of selected field sites.

17. The seismic system of claim 16 wherein said position data is communicated in near real time to said earth station hub.

18. A method for conducting a seismic survey operation, comprising:
(a) monitoring the location of equipment and personnel in the field;
(b) computing quality control parameters indicative of how accurately (a) is preformed;
(c) transmitting the quality control parameters to an information and control center via an antenna tower located in the field having a satellite transceiver and one or more satellites;
(d) receiving the quality control parameters in the information and control center;
(e) processing the seismic data quality control parameters in the information and control center; and
(f) transmitting status messages from the information and control center to personnel in the field via one or more satellites and the antenna tower.

19. The method of claim 18 further including providing the quality control parameters to a client over an on-line network.

20. The method of claim 19 wherein the network includes the Internet.

* * * * *